US 11,598,416 B2

(12) United States Patent
Persson et al.

(10) Patent No.: US 11,598,416 B2
(45) Date of Patent: Mar. 7, 2023

(54) INTERLOCKING DEVICE FOR A TRANSMISSION

(71) Applicant: Volvo Truck Corporation, Gothenburg (SE)

(72) Inventors: Marcus Persson, Gothenburg (SE); Klas Bergström, Västra Frölunda (SE); Niklas Dyverfors, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/531,992

(22) Filed: Nov. 22, 2021

(65) Prior Publication Data

US 2022/0163112 A1 May 26, 2022

(30) Foreign Application Priority Data

Nov. 23, 2020 (EP) ..................................... 20209112

(51) Int. Cl.
*F16H 63/36* (2006.01)
*F16H 63/32* (2006.01)

(52) U.S. Cl.
CPC ....... *F16H 63/36* (2013.01); *F16H 2063/325* (2013.01)

(58) Field of Classification Search
CPC ........................... F16H 63/36; F16H 2063/325
See application file for complete search history.

(56) References Cited

U.S. PATENT DOCUMENTS

| 4,132,125 A | * | 1/1979 | Janiszewski | ............ F16H 63/36 |
| | | | | 74/473.24 |
| 4,197,760 A | * | 4/1980 | Wolfe | ...................... F16H 63/20 |
| | | | | 74/473.24 |
| 5,724,856 A | * | 3/1998 | Back | ...................... F16H 63/206 |
| | | | | 74/335 |

(Continued)

FOREIGN PATENT DOCUMENTS

| CN | 104913054 A | 9/2015 |
| DE | 7714034 U1 | 1/1979 |

(Continued)

OTHER PUBLICATIONS

Extended European Search Report dated Apr. 22, 2021 for European Patent Application No. 20209112.0, 11 pages.

*Primary Examiner* — David M Fenstermacher
(74) *Attorney, Agent, or Firm* — Sage Patent Group

(57) ABSTRACT

An interlocking device for a transmission is provided, where the transmission includes a pivotable first shift fork for selectively engaging a first gear and a slidable second shift fork for selectively engaging a second gear. The interlocking device includes a pivot arm pivotable between a first position and a second position, and having a first end and a second end. The first end includes a first interacting portion that interacts with a first locking member of the first shift fork. The second end includes a second interacting portion that interacts with a second locking member of the second shift fork. In the first position, pivoting movement of the first shift fork is prevented and relative sliding movement of the second shift fork is allowed, and in the second position, relative pivoting movement of the first shift fork is allowed and relative sliding movement of the second shift fork may be prevented.

15 Claims, 6 Drawing Sheets

(56) References Cited

U.S. PATENT DOCUMENTS

| | | |
|---|---|---|
| 8,272,287 B2 | 9/2012 | Drabek et al. |
| 2014/0165766 A1* | 6/2014 | Fontana .................. F16H 63/36 74/473.24 |
| 2015/0252898 A1* | 9/2015 | Wise, Jr. .................. F16H 63/32 74/473.25 |
| 2017/0184197 A1* | 6/2017 | Kumbhar ................ F16H 63/08 |
| 2018/0106369 A1* | 4/2018 | Ichikawa ................ F16H 63/32 |
| 2021/0285539 A1* | 9/2021 | Thompson ............. F16H 61/16 |
| 2021/0285541 A1* | 9/2021 | Akatsuka ................ F16H 63/38 |
| 2022/0163112 A1* | 5/2022 | Persson .................. F16H 63/36 |
| 2022/0221053 A1* | 7/2022 | Zhong ...................... F16H 3/44 |

FOREIGN PATENT DOCUMENTS

| | | |
|---|---|---|
| DE | 4118931 A1 | 12/1992 |
| DE | 102007044519 A1 | 3/2009 |
| JP | 2007064472 A | 3/2007 |

* cited by examiner

INTERLOCKING DEVICE FOR A TRANSMISSION

CROSS-REFERENCE TO RELATED APPLICATIONS

The present application claims benefit of priority to European Patent Application No. 20209112.0, filed Nov. 23, 2020, and is assigned to the same assignee as the present application and is incorporated herein by reference.

TECHNICAL FIELD

The present disclosure relates to an interlocking device and an interlocking assembly arranged to prevent simultaneous engagement of a first gear and a second gear within a transmission. It further relates to a transmission and to a vehicle.

BACKGROUND

Interlocking devices for preventing simultaneous engagement of more than one gear in a transmission have been previously developed.

DE4118931 discloses a transmission having two pivotable shift forks, each being configured for selectively engaging an associated gear. To prevent simultaneous engagement of gears by the first and the second pivotable shift forks, an interlocking device is provided, which mechanically locks one of the shift forks in a fixed position when the other shift fork engages a gear.

However, many transmissions comprise a combination of slidable and pivotable shift forks. It is desirable to provide means for preventing simultaneous engagement of gears 25 also in such transmissions.

SUMMARY

Some embodiments described herein can be applied in heavy-duty vehicles, such as trucks, buses and construction equipment. Although some embodiments will be described 30 with respect to a truck, the inventive concepts are not restricted to this particular vehicle, but may also be used in other applications involving transmissions, as well as in other types of vehicles, such as working machines, passenger cars, etc. The inventive concepts may be applied in vehicles powered by a combustion engine, as well as in fully or partially electrically operated vehicles.

An object is to provide means for preventing simultaneous engagement of two gears in a transmission in which a pivotable shift fork is used for engaging one of the two gears, and in which a slidable shift fork is used for engaging the other one of the two gears. The inventive concepts further aim at preventing simultaneous engagement of two gears, while enabling smooth and low-friction movement of the shift fork being used most frequently.

According to a first aspect, the object is achieved by an interlocking device according to claim 1. The interlocking device is arranged to prevent simultaneous engagement of a first gear and a second gear within a transmission, the transmission comprising a pivotable first shift fork for selectively engaging the first gear and a slidable second shift fork for selectively engaging the second gear. The interlocking device comprises:

a pivot arm having a first end and a second end, the pivot arm being pivotable about a pivot axis located between the first end and the second end, wherein the first end comprises a first interacting portion configured to interact with a first locking member of the pivotable first shift fork, wherein the second end comprises a second interacting portion configured to interact with a second locking member of the slidable second shift fork, wherein the pivot arm is pivotable between at least a first position and a second position, in which first position the first interacting portion is configured to prevent relative pivoting movement of the pivotable first shift fork, and in which first position the second interacting portion is configured to allow relative sliding movement of the slidable second shift fork, i.e. movement with respect to the pivot arm, in which second position the first interacting portion is configured to allow relative pivoting movement of the pivotable first shift fork, i.e. movement with respect to the pivot arm, and in which second position the second interacting portion is configured to, when the first gear is engaged, prevent relative sliding movement of the slidable second shift fork, means for automatically prepositioning the pivot arm in the second position.

The proposed interlocking device efficiently prevents the pivotable first shift fork and the slidable second shift fork from simultaneously engaging two different gears, since movement of the shift fork which is currently not used for engaging a gear is prevented when the other shift fork is used for gear engagement. When the transmission is in neutral, i.e. when no gear is engaged, any one of the shift forks may be actuated so as to engage a gear.

By providing means for automatically prepositioning the pivot arm in the second position, i.e. biasing the pivot arm towards the second position, shifting using the pivotable shift fork is facilitated, with reduced friction and faster gear shifting. This is advantageous since the pivotable shift fork may typically be used more frequently. The pivotable shift fork may preferably be used for, via a sleeve, engaging one of two possible first gears, or be set to a neutral position. The pivotable shift fork may thus typically be movable between three predefined positions. It is of course also possible to provide a pivotable shift fork that is only movable between a single engaged position and a neutral position.

The slidable shift fork is linearly movable and may typically be movable between a single engaged position, in which it engages the second gear via a sleeve, and a neutral position, in which no gear is engaged. It is also possible to provide a slidable shift fork movable between two engaged gear positions and a neutral position.

Optionally, the means for automatically prepositioning the pivot arm in the second position comprises a biasing member. The biasing member may preferably be a resilient biasing member enabling quick prepositioning of the pivot arm in the second position.

Optionally, the biasing member is a spring, such as a torsion spring. This is advantageous in comparison with e.g. adjusting the position of the pivot axis, or by adding weight to one end of the pivot arm, such that the pivot arm is prepositioned in the second position. The spring allows a fast and precise prepositioning of the pivot arm. The spring should be configured to preposition the pivot arm with a spring force that is significantly smaller than the force applied by the slidable second shift fork to shift gears, such that efficient gear shifting using the slidable second shift fork is achieved. It is sufficient that the spring force keeps the pivot arm prepositioned in the second position in the absence of other forces applied on the pivot arm. Instead of a torsion spring, other springs may be used, such as a compression spring, an extension spring, a drawbar spring, or a volute spring.

Optionally, the spring is a torsion spring comprising:
a helical spring body configured to be mounted around the pivot axis of the pivot arm, and
a first leg with a bent end configured to be positioned atop and press against the pivot arm, between the pivot axis and the first interacting portion of the pivot arm.

By "atop" is herein to be understood the side or face of the pivot arm at which the first interacting portion is provided. By pressing on this side, the torsion spring may efficiently hold the pivot arm prepositioned in the second position.

Optionally, the torsion spring further comprises a second leg configured to be mounted in a fixed position with respect to the pivot axis. The second leg may for example be fixed in an anchoring member for mounting of the pivot arm.

Optionally, the interlocking device further comprises a pin for fixing the pivot axis of the pivot arm with respect to a housing of the transmission. The pin may be a separate part, in which case the pin is fixed with respect to the housing and defines the pivot axis, wherein the pivot arm is rotatable with respect to the pin. By providing such a separate pin, mounting of the interlocking device is facilitated. Alternatively, the pin may be integrated with the pivot arm, the pivot arm being rotatably mounted with respect to the housing, such as to an anchoring member.

Optionally, the interlocking device further comprises an anchoring member configured to hold the pin with the pivot arm mounted thereon, the anchoring member being configured to be mounted to the housing of the transmission. The anchoring member may be designed so as to avoid faulty assembly to the housing, e.g. by making it asymmetric.

Optionally, the pin has a first end with a first width configured to fit in a first receiving hole of the anchoring member, and a second end with a second width configured to fit in a second receiving hole of the anchoring member, the first width being smaller than the second width. The first receiving hole may thus be made smaller than the second width, thus keeping the pin in place.

Optionally, the torsion spring is configured to be mounted with its spring body around the pin, between the pivot arm and a first side wall of the anchoring member, the first side wall comprising the first receiving hole. Assembly of the interlocking device may thereby be facilitated, in particular if the second leg is fixed by introducing it into the anchoring member.

Optionally, the first interacting portion comprises a recess configured to lockingly receive the first locking member of the pivotable first shift fork in the first position of the pivot arm. The first locking member may thus be a pointed end of the pivotable first shift fork. This is advantageous, since the weight of the pivoting first locking member may thereby be reduced. Alternatively, it is possible to provide the first locking member with a recess configured to lockingly receive a protrusion provided on the first interacting portion.

Optionally, the first interacting portion comprises at least one curved surface having a radius of curvature corresponding to a pivoting radius of the pivotable first shift fork. In other words, when the pivotable first shift fork is actuated, the first locking member of the pivotable first shift fork describes a curve which coincides with the at least one curved surface of the first interacting portion. This ensures locking along an entire stroke length of the pivotable first shift fork. The first interacting portion may comprise two such curved surfaces, one on each side of a recess configured to lockingly receive the first locking member in the first position of the pivot arm.

According to a second aspect, the object is also achieved by an interlocking assembly arranged to prevent simultaneous engagement of a first gear and a second gear within a transmission, the interlocking assembly comprising:
a pivotable first shift fork for selectively engaging at least one first gear,
a slidable second shift fork for selectively engaging at least one second gear, and
the interlocking device according to the first aspect.

Optionally, the interlocking assembly further comprises:
a first sleeve, the pivotable first shift fork being configured for actuating the first sleeve such as to selectively engage one of the at least one first gear,
a second sleeve, the slidable second shift fork being configured for actuating the second sleeve in order to selectively engage one of the at least one second gear.

Optionally, two first gears and a single second gear are provided. The first sleeve may thus be slidable between three predefined positions, and the second sleeve between two predefined positions.

Further advantages and advantageous features of the interlocking assembly appear from the above description of the first aspect.

According to a third aspect, the object is also achieved by a transmission for a vehicle, the transmission comprising the interlocking assembly according to the second aspect, at least one first gear, and at least one second gear. The transmission may optionally be an automated manual transmission (AMT), or a manual transmission. It may e.g. be a transmission in which the at least one first gear and the at least one second gear are provided at different shafts of the transmission, or at the same shaft.

Advantages and advantageous features of the transmission appear from the above description of the first and second aspects.

According to a fourth aspect, the object is also achieved by a vehicle comprising the transmission according to the third aspect. Advantages and advantageous features of the vehicle appear from the above description of the other aspects. The vehicle may be a heavy-duty vehicle such as a truck or a bus. It may optionally be a fully electrified vehicle, or a hybrid vehicle comprising at least one combustion engine in addition to one or more electric machines, or a vehicle powered by only a combustion engine.

Further advantages and advantageous features are disclosed in the following description and in the dependent claims.

BRIEF DESCRIPTION OF THE DRAWINGS

With reference to the appended drawings, below follows a more detailed description of embodiments cited as examples.

In the drawings.

Figure 1:
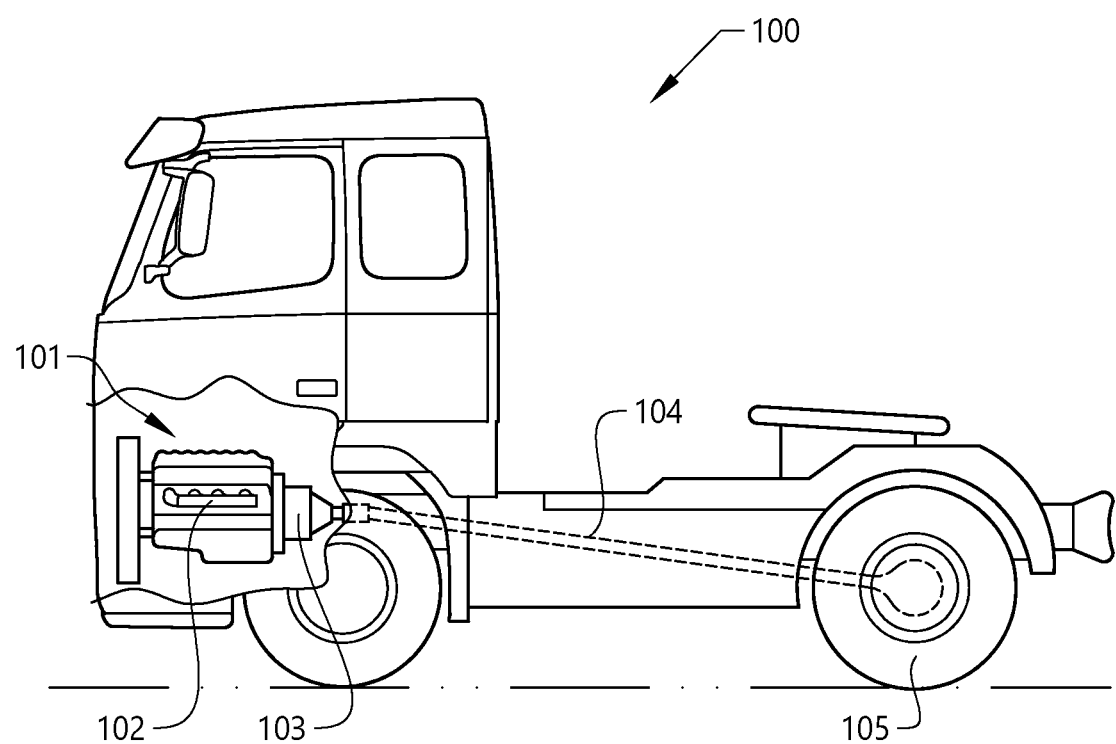
FIG. 1 is a side view of a vehicle in which an interlocking device, assembly and transmission according to some embodiments may be applied.

The drawings show diagrammatic exemplifying embodiments and are thus not necessarily drawn to scale. It shall be understood that the embodiments shown and described are exemplifying and that the inventive concepts are not limited to these embodiments. It shall also be noted that some details in the drawings may be exaggerated in order to better describe and illustrate the inventive concepts. Like reference characters refer to like elements throughout the description, unless expressed otherwise.

DETAILED DESCRIPTION OF EXAMPLE EMBODIMENTS

A vehicle 100 in the form of a truck according to an exemplary embodiment is schematically shown in FIG. 1. The vehicle 100 includes a powertrain 101 with an internal combustion engine 102 for propulsion of the vehicle 100. The engine 102 is connected to a transmission 103 arranged to transfer torque from the engine 102 to a drive shaft 104, connecting the transmission 103 to a driving axle (not shown) that drives driving wheels 105 of the vehicle 100. The vehicle 100 may of course be arranged with more than one driving axle, such as two or more driving axles.

Figure 2:
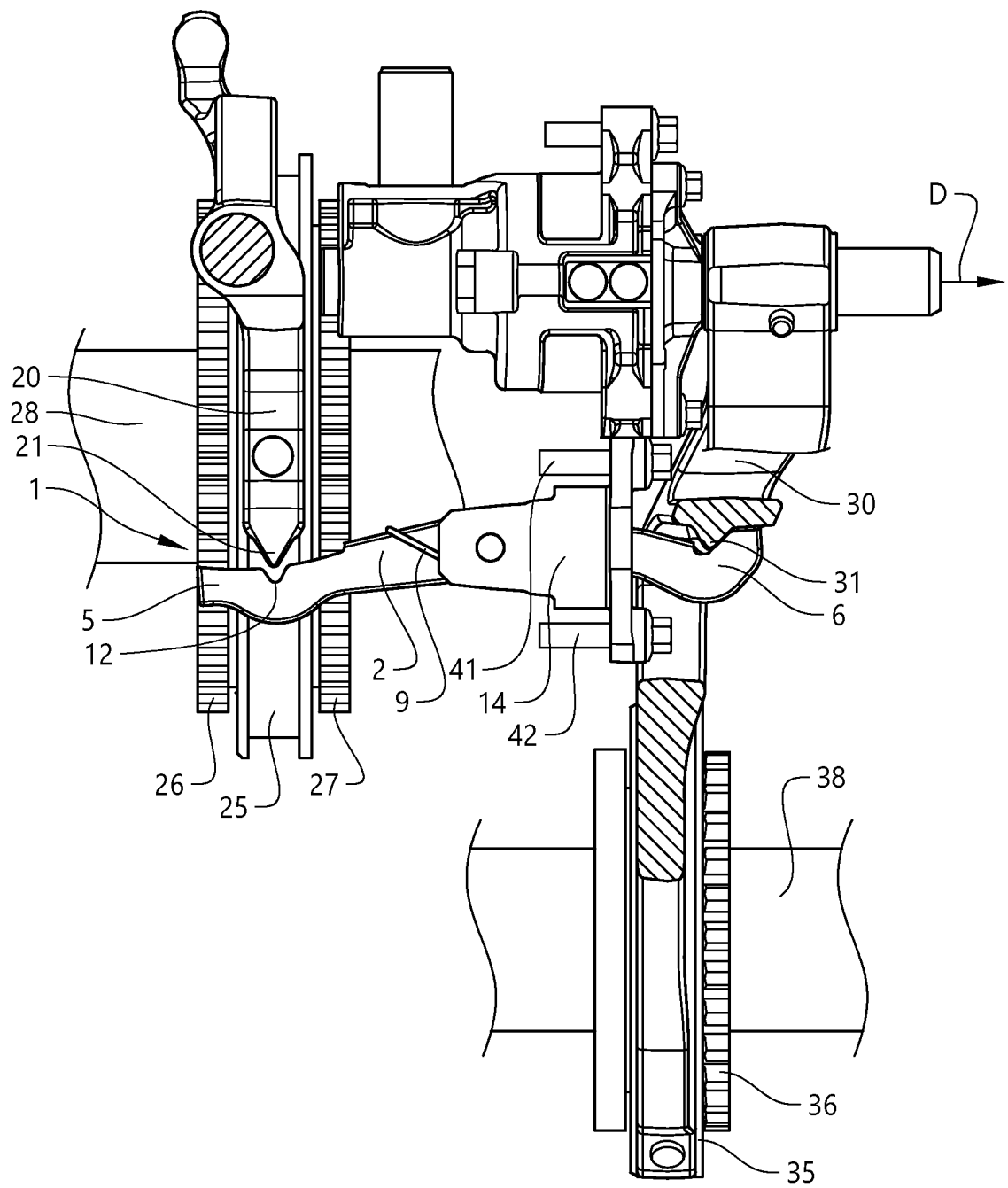
FIG. 2 is a side view of an interlocking assembly according to an embodiment.

Reference is now made to FIG. 2, illustrating parts of a transmission in which an interlocking device 1 according to an embodiment is provided. The interlocking device 1 may e.g. be provided within the transmission 103 illustrated in FIG. 1 and forms part of an interlocking assembly arranged to prevent simultaneous engagement of one of two first gears 26, 27 and a second gear 36 within the transmission 103. The first gears 26, 27 are herein mounted on a first shaft 28 of the transmission 103, and the second gear 36 is mounted on a second shaft 38. A pivotable first shift fork 20 is provided for selectively engaging one of the two first gears 26, 27 via a first sleeve 25 mounted on the first shaft 28. A slidable second shift fork 30 is provided for selectively engaging the second gear 36 via a second sleeve 35 mounted on the second shaft 38. Both the pivotable first shift fork 20 and the slidable second shift fork 30 may be set to a neutral position, i.e. a position in which the respective sleeve 25, 35 does not engage a gear.

Figure 5:
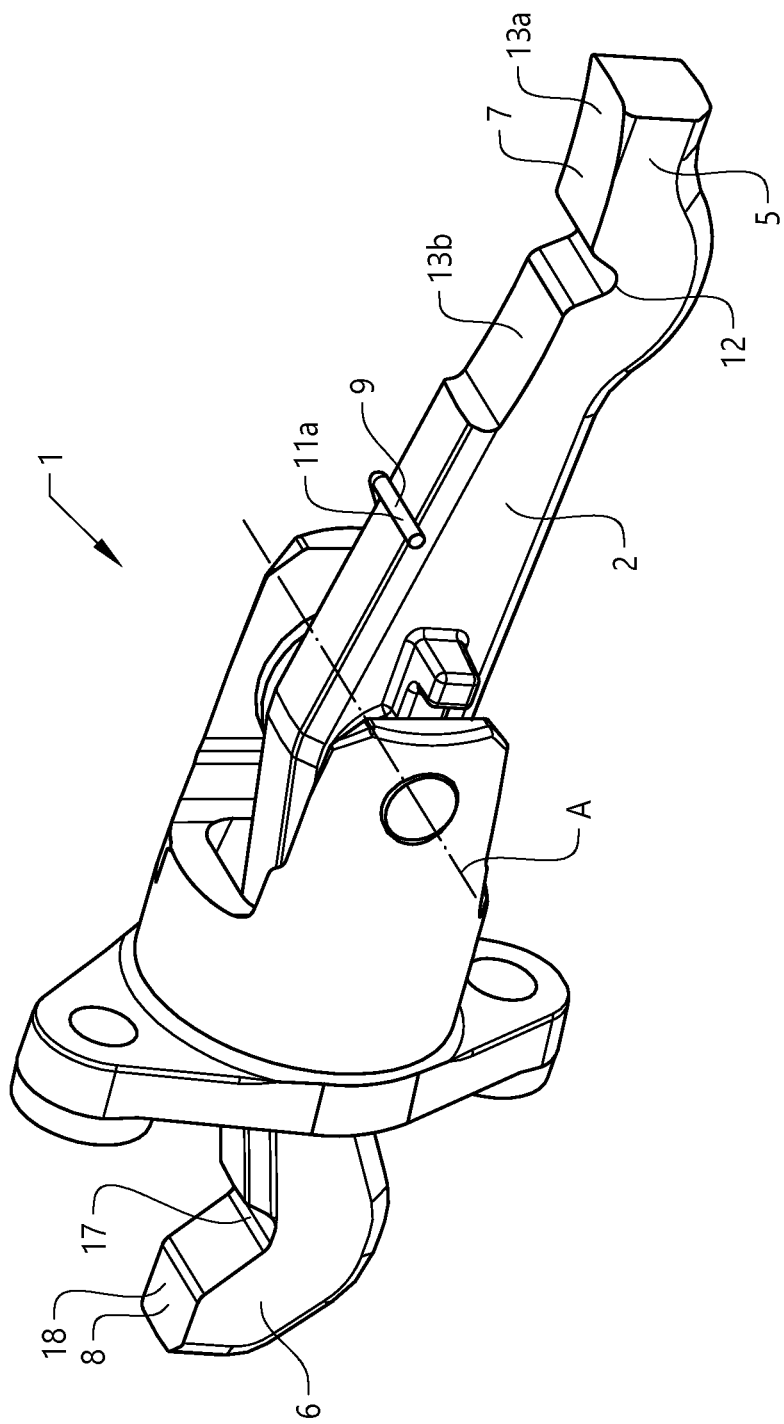
FIG. 5 is a perspective view of an interlocking device according to an embodiment.

Reference is now also made to FIG. 5, illustrating the interlocking device 1 in further detail. The interlocking device 1 comprises a pivot arm 2 having a first end 5 and a second end 6, the pivot arm 2 being pivotable about a pivot axis A located between the first end 5 and the second end 6. The first end 5 comprises a first interacting portion 7 configured to interact with a first locking member 21 of the pivotable first shift fork 20. The first locking member 21 is herein a tip of the first shift fork 20. The first interacting portion 7 comprises a recess 12 configured to lockingly receive the first locking member 21 of the pivotable first shift fork 20 in a first position of the pivot arm. The recess 12 is formed in a curved surface 13*a*, 13*b* having a radius of curvature corresponding to a pivoting radius R of the pivotable first shift fork 20. The curved surface 13*a*, 13*b* may in this case be regarded as a first curved surface 13*a* and a second curved surface 13*b*, separated by the recess 12. When the first gear 26 is engaged, the first locking member 21 of the pivotable first shift fork 20 makes contact with the first curved surface 13*a*, and when the first gear 27 is engaged, the first locking member 21 makes contact with the second curved surface 13*b*.

The second end 6 comprises a second interacting portion 8 configured to interact with a second locking member 31 of the slidable second shift fork 30. The second locking member 31 is herein in the form of a protrusion, protruding perpendicularly with respect to a sliding direction D of the second slidable shift fork 30. The second interacting portion 8 comprises a recess 17 configured to receive the second locking member 30 in a second position of the pivot arm 2, and a flat contact surface 18 with which the second locking member 31 is in contact when the second gear 35 is engaged.

FIG. 2 shows the transmission in neutral, i.e. none of the gears 26, 27, 36 is engaged. In neutral, any one of the pivotable first shift fork 20 and the slidable second shift fork 30 may be actuated to engage one of the gears 26, 27, 36. As soon as a gear is engaged, the interlocking device 1 prevents simultaneous engagement of another gear.

Figure 3:
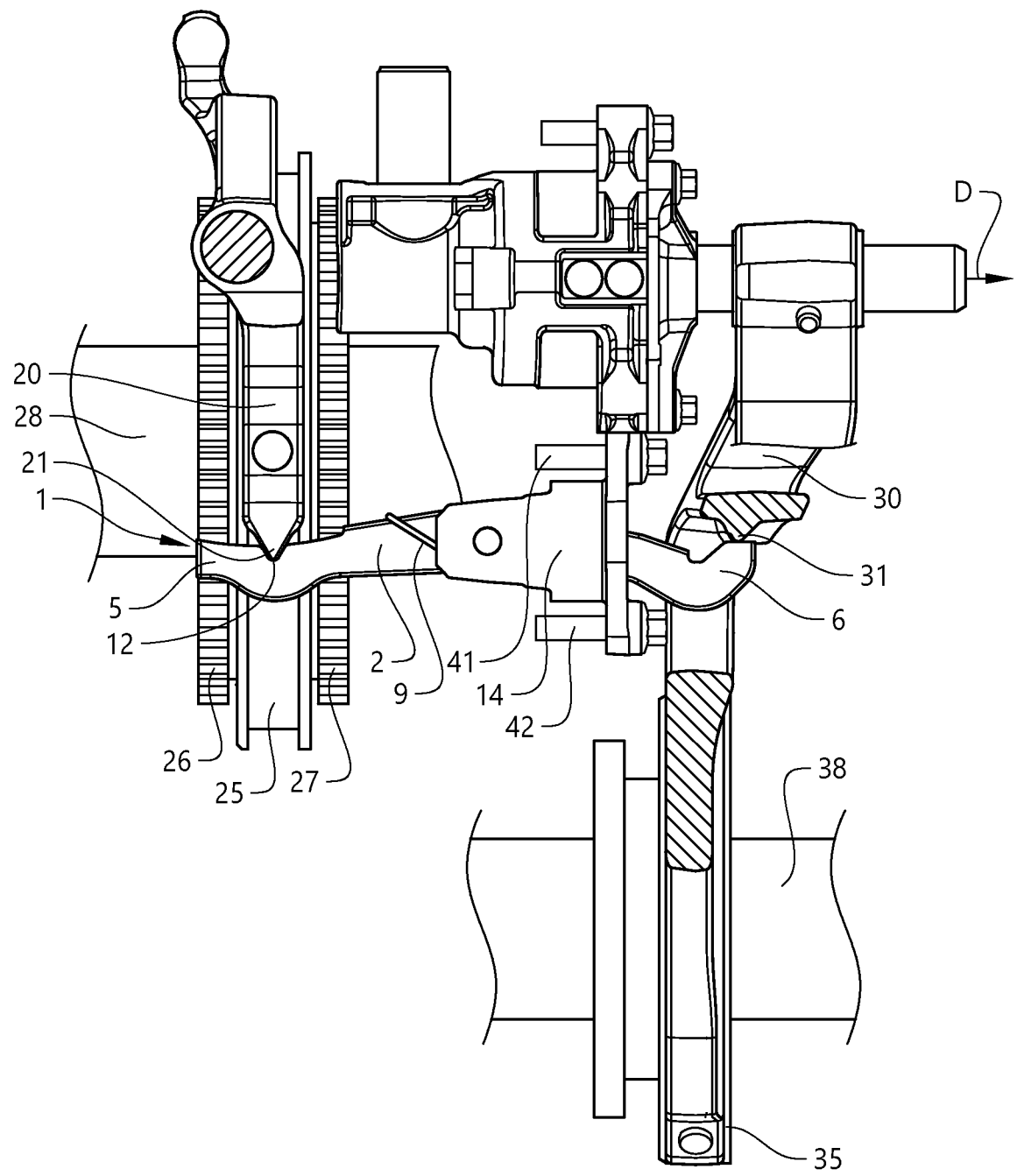
FIG. 3 is another side view of the interlocking assembly in FIG. 2.
Figure 4:
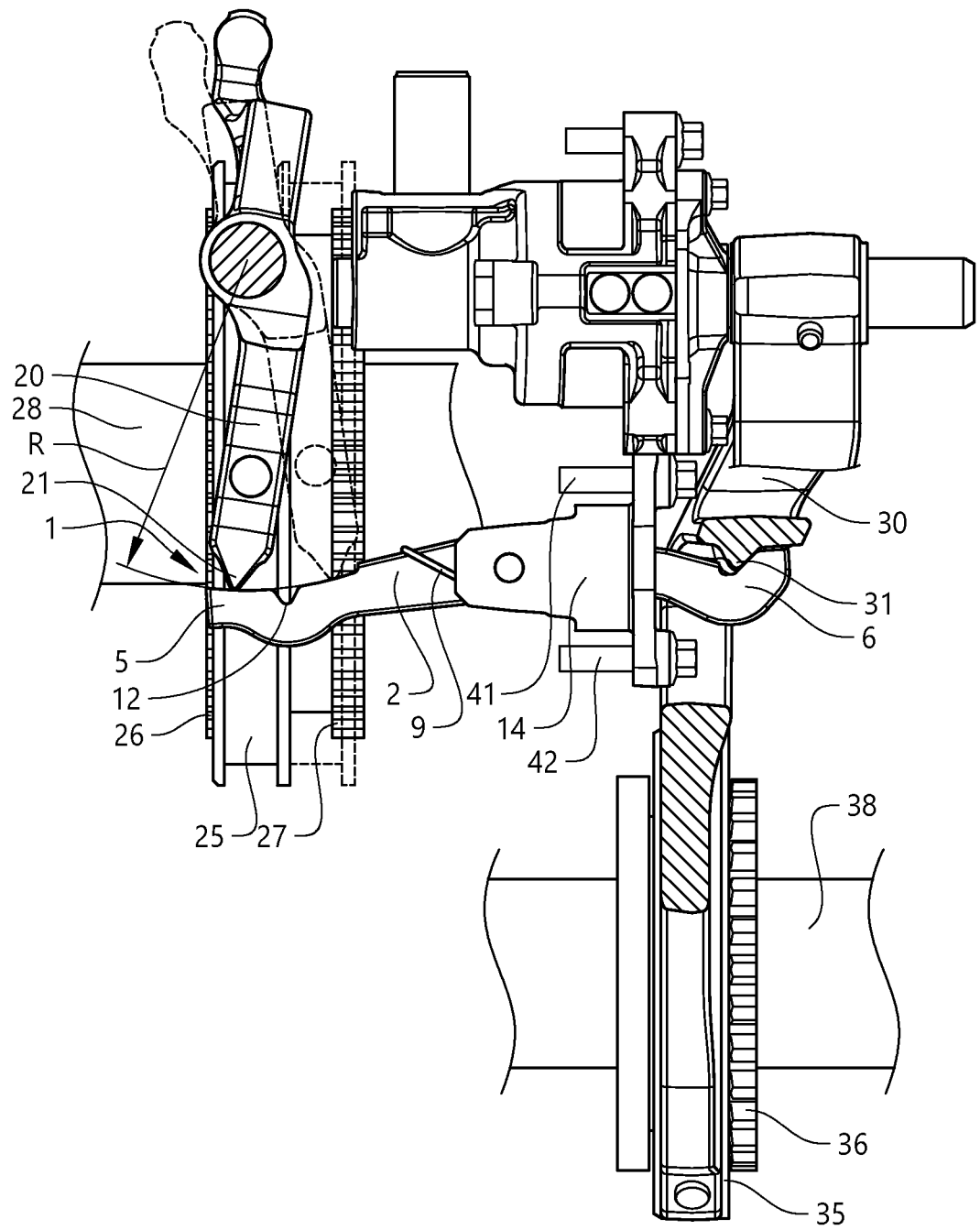
FIG. 4 is another side view of the interlocking assembly in FIG. 2.

The pivot arm 2 is pivotable between a first position illustrated in FIG. 3 and a second position illustrated in FIG. 4. The engagement of the second gear 36 fixes the pivot arm 2 in the first position, since the second locking member 31 presses on the flat contact surface 18. In the first position, the first interacting portion 7 prevents relative pivoting movement of the pivotable first shift fork 20, thus keeping the first sleeve 25 fixed in a neutral position in which no one of the first gears 26, 27 is engaged. This is achieved by lockingly receiving the first locking member 21 of the pivotable first shift fork 20 in the recess 12. In the first position, the second interacting portion 7 allows sliding movement of the slidable second shift fork 30 in the direction D, such that it may actuate the second sleeve 35 and engage/disengage the second gear 36, which in FIG. 3 is shown as engaged.

The engagement of one of the first gears 26, 27 instead fixes the pivot arm 2 in the second position, since the first locking member 21 presses on one of the curved surfaces 13*a*, 13*b*. In the second position, the first interacting portion 7 of the pivot arm 2 is positioned such that it allows relative pivoting movement of the pivotable first shift fork 20, while the second interacting portion 8 prevents relative sliding movement of the slidable second shift fork 30 by lockingly receiving the second locking member 31 in the recess 17.

The interlocking device 1 further comprises a means for automatically prepositioning the pivot arm 2 in the second position when no gear is engaged, i.e. when the transmission is in neutral such as shown in FIG. 2. The means for automatically prepositioning the pivot arm 2 in the second position is in the shown embodiment a biasing member, namely a spring 9 in the form of a torsion spring. The spring 9 is best seen in FIG. 6.

The spring 9 has a helical spring body 10 configured to be mounted around the pivot axis A of the pivot arm 2, and a first leg 11 with a bent end 11*a* configured to be positioned atop and press against the pivot arm 2, between the pivot axis A and the first interacting portion 7 of the pivot arm 2, i.e. proximate the first end 5 of the pivot arm 2. The spring 9 further comprises a second leg 19 configured to be mounted in a fixed position with respect to the pivot axis A.

A pin 15 is provided for fixing the pivot axis A of the pivot arm 2 with respect to a housing of the transmission 103. In the shown embodiment, the pivot arm 2 is configured to be rotatably mounted on the pin 15. The pivot arm 2 comprises a centrally located through-hole for receiving the pin 15. A first annular flange 4*a* and a second annular flange 4*b* extend on opposite sides of the through-hole. The pin 15 has a mainly circle cylindrical shape with a first end 15*a* having an end portion with a relatively small first diameter (width), and a main portion including a second end 15*b* having a second diameter (width) larger than the first diameter. An anchoring member 14 configured to hold the pin 15 with the pivot arm 2 mounted thereon is further provided, the anchoring member 14 being configured to be mounted to a housing (not shown) of the transmission using fastening members (not shown). The anchoring member 14, the pin 15 and the pivot arm 2 are configured so that they may only be assembled in a correct configuration together with the spring 9. For this purpose, the anchoring member 14 is asymmetric. It has a first side wall 14a comprising a first receiving hole 16a dimensioned so as to receive the first end 15a of the pin 15. A second side wall 14b of the anchoring member 14, opposite the first side wall 14a, comprises a second receiving hole 16b dimensioned so as to receive the second end 15b of the pin 15. The second side wall 14b has a shorter extension than the first side wall 14a in a direction of extension E of the pivot arm 2. The pivot arm 2 further comprises a protrusion 3 provided in connection with the second annular flange 4b, so that the pivot arm 2 may only be mounted with the protrusion 3 adjacent the second side wall 14b of the anchoring member 14, and with the spring 9 mounted with its spring body 10 extending around the first annular flange 4a of the pivot arm 2, between the pivot arm 2 and the first side wall 14a of the anchoring member 14.

Figure 6:
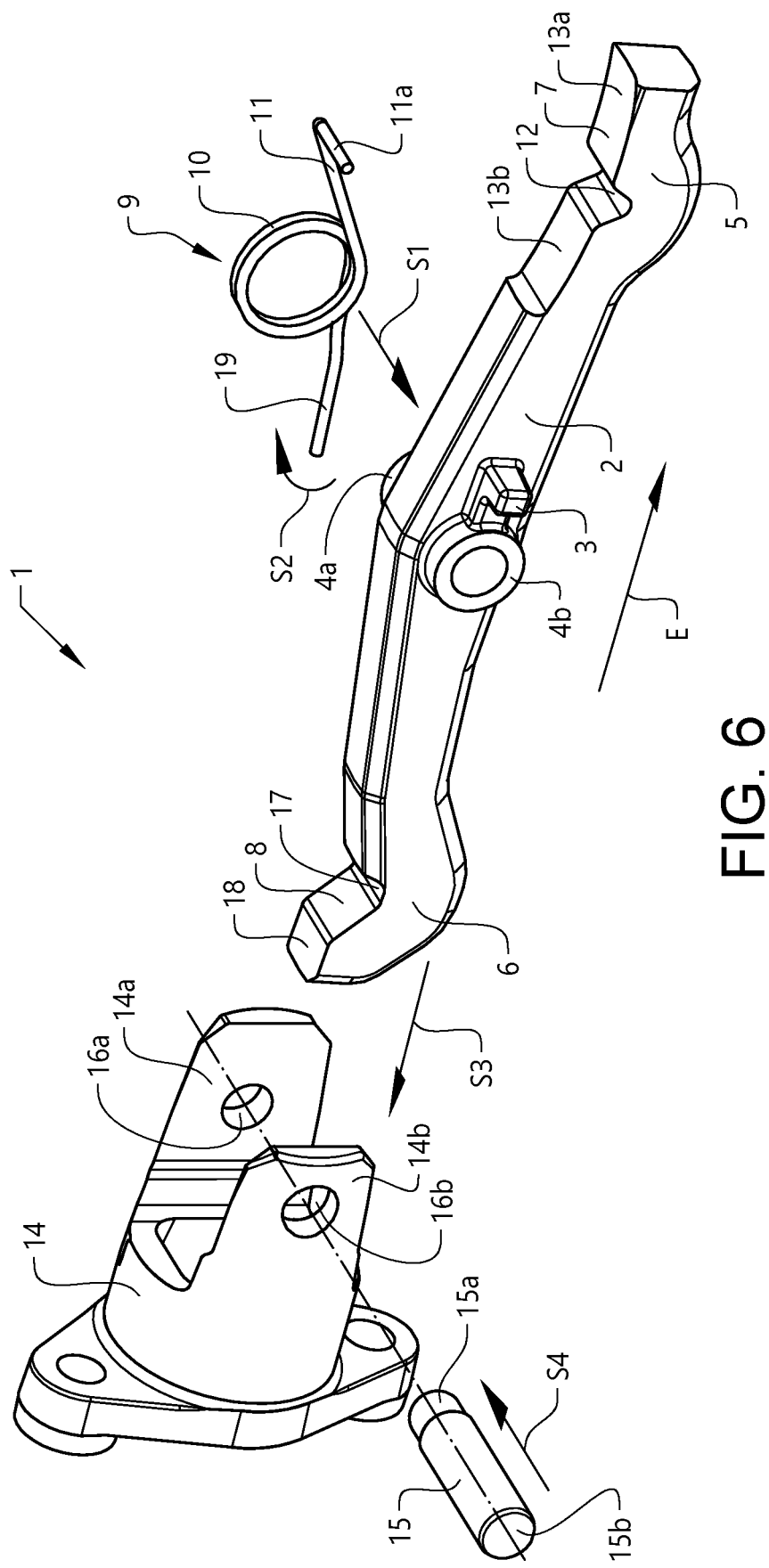
FIG. 6 is an exploded view of the interlocking device in FIG. 5.

To assemble the interlocking device 1, the following steps are performed, also illustrated in FIG. 6:

S1: The spring 9 is mounted with its spring body 10 around the first annular flange 4a of the pivot arm 2 and with its bent end 11a positioned atop the pivot arm 2;

S2: The second leg 19 of the spring 9 is bent into a position allowing it to be subsequently locked within the anchoring member 14;

S3: The pivot arm 2 with the spring 9 mounted thereon is inserted into the anchoring member 14, so that the through-hole of the pivot arm 2 lines up with the first and second receiving holes 16a, 16b and so that the second leg 19 of the spring 9 is received in a locking groove (not shown) of the anchoring member 14; and S4: The pin 15 is introduced into the through-hole of the pivot arm 2, via the second receiving hole 16b and until its first end 15a is received in the first receiving hole 16a, thereby mounting the pivot arm 2 with its pivot axis A fixed with respect to the anchoring member 14. The anchoring member may thereafter be mounted to the housing of the transmission in such a way that the pin 15 is prevented from falling out through the second receiving hole 16b. The housing may e.g. comprise an opening (not shown) for receiving the anchoring member 14, wherein the opening has a side wall blocking the second receiving hole 16b.

It is to be understood that the inventive concepts are not limited to the embodiments described above and illustrated in the drawings; rather, the skilled person will recognize that many changes and modifications may be made within the scope of the appended claims.

The invention claimed is:

1. An interlocking device arranged to prevent simultaneous engagement of a first gear and a second gear within a transmission, the transmission comprising a pivotable first shift fork for selectively engaging the first gear and a slidable second shift fork for selectively engaging the second gear, the interlocking device comprising:
a pivot arm having a first end and a second end, the pivot arm being pivotable about a pivot axis located between the first end and the second end,
wherein the first end comprises a first interacting portion configured to interact with a first locking member of the pivotable first shift fork,
wherein the second end comprises a second interacting portion configured to interact with a second locking member of the slidable second shift fork,
wherein the pivot arm is pivotable between at least a first position and a second position,
in the first position the first interacting portion is configured to prevent relative pivoting movement of the pivotable first shift fork, and in the first position the second interacting portion is configured to allow relative sliding movement of the slidable second shift fork,
in the second position the first interacting portion is configured to allow relative pivoting movement of the pivotable first shift fork, and in the second position the second interacting portion is configured to, when the first gear is engaged, prevent relative sliding movement of the slidable second shift fork,
a means for automatically prepositioning the pivot arm in the second position.

2. The interlocking device according to claim 1, wherein the means for automatically prepositioning the pivot arm in the second position comprises a biasing member.

3. The interlocking device according to claim 2, wherein the biasing member is a spring, such as a torsion spring.

4. The interlocking device according to claim 3, wherein the torsion spring comprising:
a helical spring body configured to be mounted around the pivot axis of the pivot arm, and
a first leg with a bent end configured to be positioned atop and press against the pivot arm, between the pivot axis and the first interacting portion of the pivot arm.

5. The interlocking device according to claim 4, wherein the torsion spring further comprises a second leg configured to be mounted in a fixed position with respect to the pivot axis (A).

6. The interlocking device according to claim 1, further comprising a pin for fixing the pivot axis of the pivot arm with respect to a housing of the transmission.

7. The interlocking device according to claim 6, further comprising an anchoring member configured to hold the pin with the pivot arm mounted thereon, the anchoring member being configured to be mounted to the housing of the transmission.

8. The interlocking device according to claim 7, wherein the pin has a first end with a first width configured to fit in a first receiving hole of the anchoring member, and a second end with a second width configured to fit in a second receiving hole of the anchoring member, the first width being smaller than the second width.

9. The interlocking device according to claim 8,
wherein the torsion spring is a torsion spring comprising:
a helical spring body configured to be mounted around the pivot axis of the pivot arm, and a first leg with a bent end configured to be positioned atop and press against the pivot arm, between the pivot axis and the first interacting portion of the pivot arm; and
wherein the torsion spring is configured to be mounted with its spring body around the pin, between the pivot arm and a first side wall of the anchoring member, the first side wall comprising the first receiving hole.

10. The interlocking device according to claim 1, wherein the first interacting portion comprises a recess configured to lockingly receive the first locking member of the pivotable first shift fork in the first position of the pivot arm.

11. The interlocking device according to claim 1, wherein the first interacting portion comprises at least one curved surface having a radius of curvature corresponding to a pivoting radius of the pivotable first shift fork.

12. An interlocking assembly arranged to prevent simultaneous engagement of a first gear and a second gear within a transmission, the interlocking assembly comprising:
   a pivotable first shift fork for selectively engaging at least one first gear,
   a slidable second shift fork for selectively engaging at least one second gear, and
   the interlocking device according to claim 1.

13. The interlocking assembly according to claim 12, further comprising:
   a first sleeve, the pivotable first shift fork being configured for actuating the first sleeve such as to selectively engage the at least one first gear,
   a second sleeve, the slidable second shift fork being configured for actuating the second sleeve in order to selectively engage the at least one second gear.

14. A transmission for a vehicle, the transmission comprising the interlocking assembly according to claim 12, at least one first gear, and at least one second gear.

15. A vehicle comprising the transmission according to claim 14.

* * * * *